(12) United States Patent
Feng et al.

(10) Patent No.: US 7,733,519 B2
(45) Date of Patent: Jun. 8, 2010

(54) COMPENSATION METHOD OF DIGITAL IMAGE DATA

(76) Inventors: Chang-Yung Feng, No. 669, Ruey Kuang Road, Taipei (TW) 114; Yih-Ming Lin, No. 669, Ruey Kuang Road, Taipei (TW) 114; Hung-Tse Lin, No. 669, Ruey Kuang Road, Taipei (TW) 114

( * ) Notice: Subject to any disclaimer, the term of this patent is extended or adjusted under 35 U.S.C. 154(b) by 1430 days.

(21) Appl. No.: 11/124,974

(22) Filed: May 9, 2005

(65) Prior Publication Data

US 2006/0132658 A1 Jun. 22, 2006

(30) Foreign Application Priority Data

Dec. 22, 2004 (TW) ............... 93139951 A

(51) Int. Cl.
*H04N 1/00* (2006.01)
*H04N 1/04* (2006.01)

(52) U.S. Cl. .............. 358/1.6; 358/1.9; 358/474; 358/475; 358/509

(58) Field of Classification Search ........... 358/475, 358/509, 474, 461, 445, 443, 1.6, 1.9, 1.1, 358/504, 505, 506, 510, 516, 518, 520, 483, 358/482, 530, 3.22, 3.23, 2.1; 382/274, 162, 382/167, 270, 271, 272, 273, 312; 347/224, 347/225, 226, 253, 252; 399/4, 47, 51
See application file for complete search history.

(56) References Cited

U.S. PATENT DOCUMENTS

| | | | |
|---|---|---|---|
| 7,447,379 B2* | 11/2008 | Choe et al. | 382/274 |
| 2002/0100863 A1* | 8/2002 | Spears | 250/208.1 |

* cited by examiner

*Primary Examiner*—Dov Popovici
(74) *Attorney, Agent, or Firm*—Workman Nydegger

(57) ABSTRACT

The present invention relates to a compensation method for compensating digital image data generated from a scanning module of a scanner when the luminance of a lamp tube is unstable. Several compensating gains are computed according to the luminance values of a reference white plate so as to compensate the digital image data. The method of the present invention is implemented by software in a computer.

17 Claims, 4 Drawing Sheets

COMPENSATION METHOD OF DIGITAL IMAGE DATA

FIELD OF THE INVENTION

The present invention relates to a compensation method of digital image data, and more particularly to a compensation method of digital image data generated when the luminance of a scanner's lamp tube is unstable.

BACKGROUND OF THE INVENTION

As known, a scanner can be used to perform a scanning operation after the scanner has been turned on for a warm-up time period.

The warm-up time period is attributed to a cold cathode fluorescent lamp (CCFL) used in the common scanner.

Referring to FIG. 1, a plot of the luminance variation of a cold cathode fluorescent lamp is illustrated. As shown in FIG. 1, in the initial stage from start of the scanner, the luminance of the cold cathode fluorescent lamp is slowly increased. Later, after the scanner has been turned on for a certain time period, e.g. T1 seconds, the luminance of the lamp approaches stable.

As known, the luminance value of the image data obtained when the scanner is operated in the unstable state is very different from that obtained when the scanner is operated in the stable state. For example, if the luminance value of the image data obtained in the stable state is assumed as 100, the luminance value obtained in the unstable state when the warm-up cycle of the lamp tube is not completed may be lower than 100, e.g. 70. Accordingly, for most scanners, a sufficient warm-up time period is necessary in order to achieve accurate image data.

Such a method of operating the scanner is not satisfactory because the scanning operation begins to be performed after the warm-up time period is due. Therefore, it is important to develop a method for performing the scanning operation without waiting for the warm-up time period.

Some scanning methods with no warm-up time period were disclosed. These scanning methods, however, employ specially designed circuits to control the luminance value of the image data by adjusting the reference voltage levels of the analog/digital conversion circuits built in the scanners.

Since the specially designed circuit is required for adjusting the reference voltage levels of the analog/digital conversion circuit built in the scanner so as to compensate the image data, the cost and the circuitry complexity of the scanner are increased.

SUMMARY OF THE INVENTION

It is an object of the present invention to provide a compensation method of digital image data to perform the scanning operation without waiting for the warm-up time period.

Another of the present invention is to provide a compensation method of digital image data by using software in a personal computer so as to save the cost for implementing the compensation method.

In accordance with a first aspect of the present invention, there is provided a compensation method for compensating digital image data generated from a scanning module of a scanner when the luminance of a lamp tube is unstable. Firstly, a target luminance value T is provided. Then, a first reference luminance value W1 obtained when the scanning module scans a standard color at a first scanning position is provided. According to the target luminance value T and the first reference luminance value W1, a first compensating gain G1, wherein G1=T/W1. Then, a second reference luminance value W2 obtained when the scanning module scans the standard color at a second scanning position is provided. According to the first reference luminance value W1, the first compensating gain G1 and the second reference luminance value W2 a second compensating gain G2 is computed. When the first compensating gain G1 is lager than the second compensating gain G2 by a threshold value, the original luminance values of image data are compensated with the second compensating gain G2 and a third compensating gain G3 is computed. When the second compensating gain G2 is less than the first compensating gain G1 and the difference between the first compensating gain G1 and the second compensating gain G2 is less than the threshold value, the original luminance values of image data are compensated with the second compensating gain G2 without computing the third compensating gain G3.

In accordance with a second aspect of the present invention, there is provided an image scanning system for implementing the compensation method of the present invention. The image scanning system comprises an image scanner and data processing device. The image scanner is for generating a digital image signal of a scanned object, and comprises a lamp tube for providing a source light to be used for scanning the scanned object, a scanning module, a color reference region for providing a standard color and an output port for outputting the digital image signal. The data processing device is electrically connected to the output port of the image scanner for receiving and compensating the digital image signal generated when the luminance of the lamp tube of the image scanner is unstable, wherein the data processing device compensates the digital image signal according to the luminance values of the color reference region.

Preferably, the data processing device is a personal computer, and the compensating step is implemented by software installed in the personal computer.

In accordance with a third aspect of the present invention, there is provided a luminance compensation method for compensating digital image data of plural scan lines generated from a scanning module of a scanner. Firstly, a first compensating gain is computed according to a first luminance value of a reference color, and the luminance values of digital image data for N scan lines are compensated with the first compensating gain. Then, a second compensating gain is computed according to a second luminance value of the reference, and the luminance values of digital image data for M scan lines are compensated with the second compensating gain. Afterward, the first compensating gain is compared with the second compensating gain, and it is discriminated whether a third compensating gain is to compute according to the comparing result.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
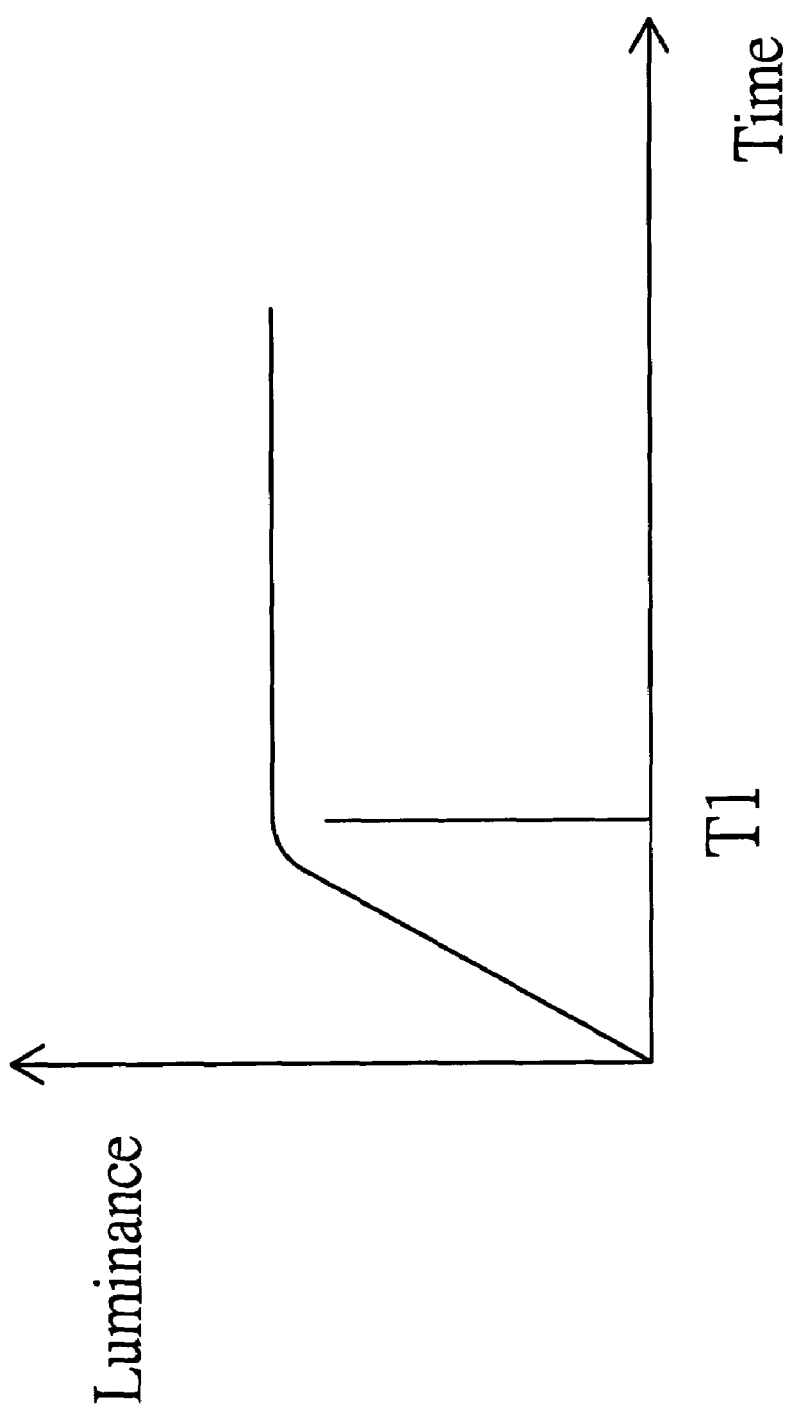
FIG. 1 is a plot illustrating the luminance variation of a cold cathode fluorescent lamp.
Figure 2:
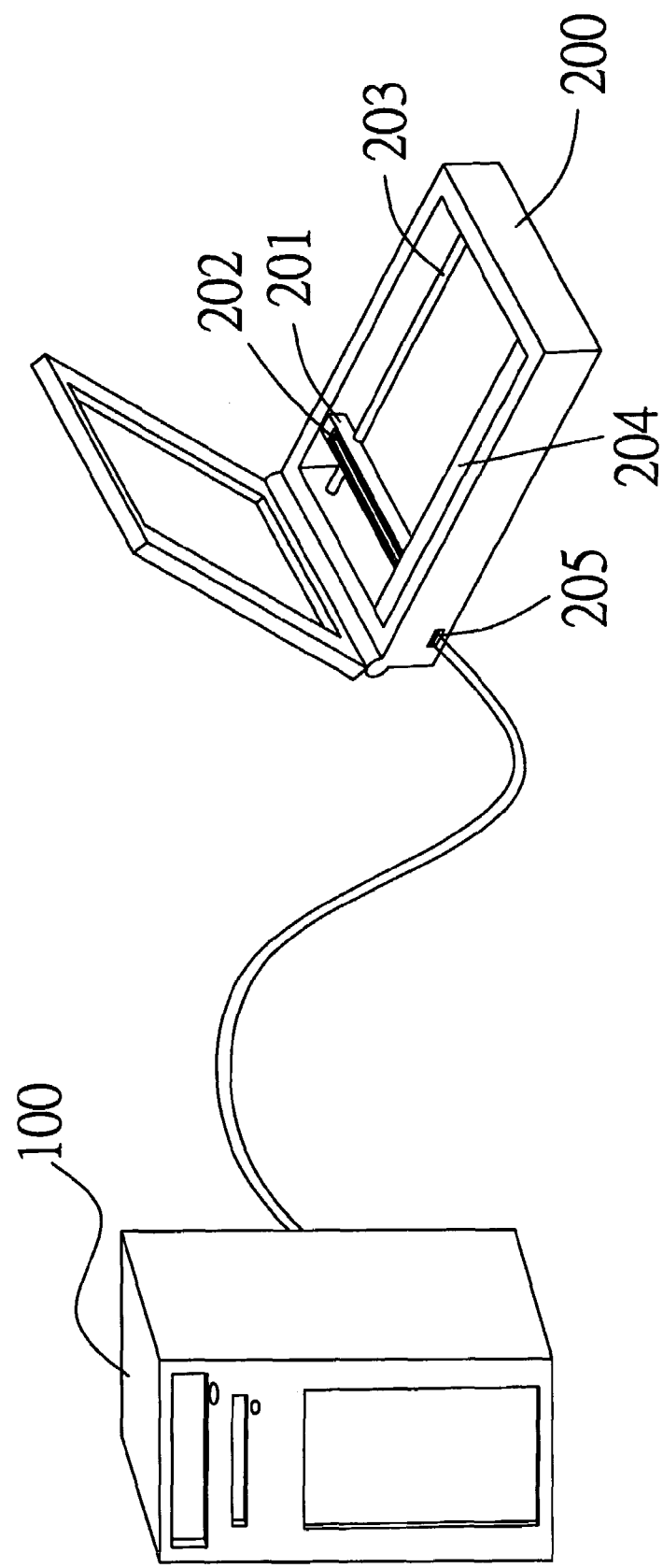
FIG. 2 is a schematic view of an image scanning system according to a preferred embodiment of the present invention.

Referring to FIG. 2, a schematic view of an image scanning system according to a preferred embodiment of the present invention is shown. The image scanning system comprises an image scanner 200 including a scanning module 201, a lamp tube 202, a glass platform 203, a color reference region 204 and an output port 205. The image scanner 200 is electrically connected to a data processing device 100 via the output port 205.

In this embodiment, the color reference region 204 is an elongated white plate fixed on the glass platform 203 and arranged in parallel with a lateral side of the glass platform 203. An exemplary data processing device 100 is a personal computer. It is noted that, however, those skilled in the art will readily observe that numerous modifications and alterations of the reference white plate 204 may be made while retaining the teachings of the invention. For example, the reference white plate 204 may have an arbitrary shape. In addition, the reference white plate 204 may be a white region arranged on an end of the signal receiving face of the scanning module 201 as long as the image of the white region is detectable by the sensing element contained within the scanning module 201. Accordingly, the above disclosure should be limited only by the bounds of the following claims.

The lamp tube 202 and a sensor for generating an image signal of a scanned object, for example a charge couple device (CCD) are disposed within the scanning module 201.

The image data of the scanned object are transmitted to the personal computer 100 via the output port 205, and processed by software in the personal computer so as to compensate the luminance value of the image data.

Figure 3:
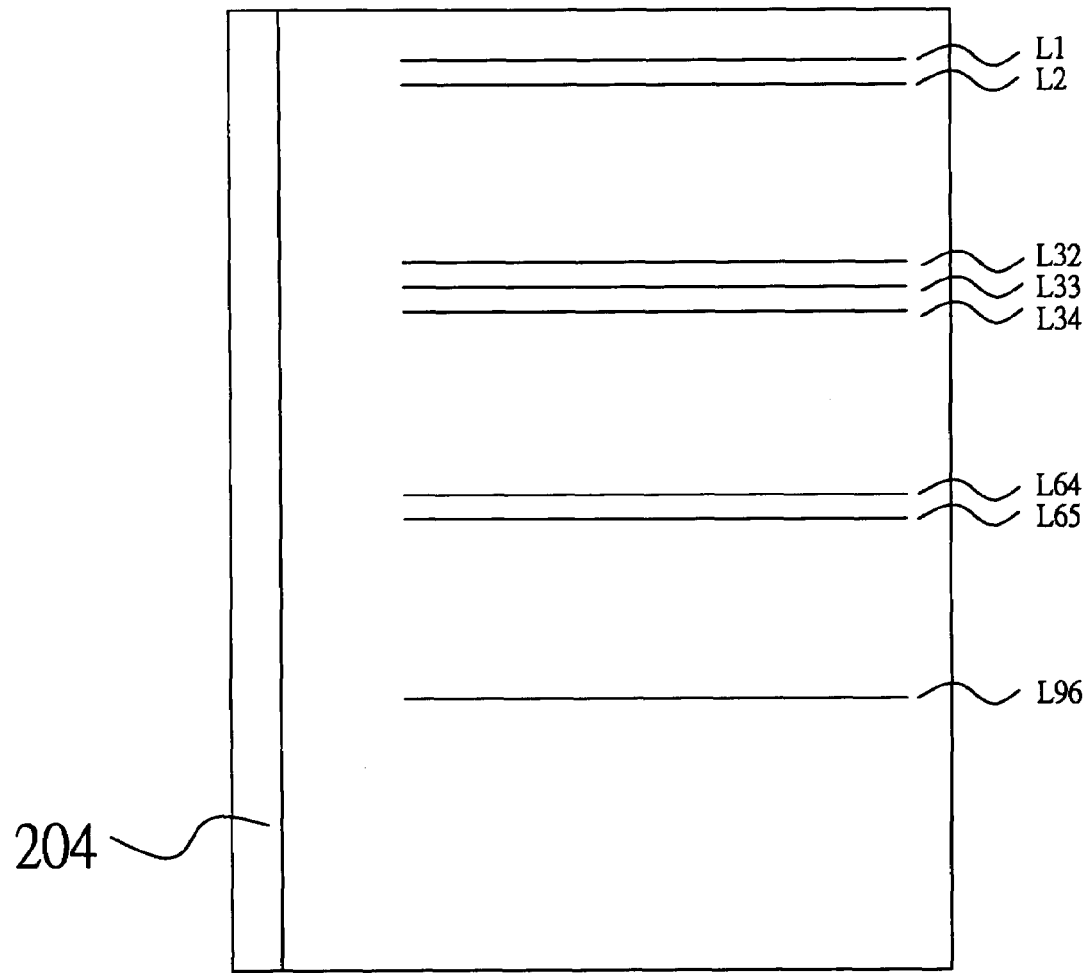
FIG. 3 is a schematic view illustrating the reference white plate and the scan lines.

Please refer to FIG. 3, which is a schematic view illustrating the reference white plate and the scan lines. The compensation method of the present invention is performed according to execution of the software in the personal computer and will be described as follows with reference to FIG. 3.

In the initial stage from start of the scanner, since the luminance of the lamp tube has not been stable, the luminance values of some scan lines may be lower than those when the luminance of the lamp tube is in the stable state. For example, provided that the luminance value of the reference white plate 204 obtained in the stable state is 200, the luminance value of the reference white plate and the compensated luminance value for each scan line are given in the following table.

TABLE

| Position of scan line | Luminance value of reference white plate (W) | Gain | Compensated luminance value (Data = luminance value of original image data) |
|---|---|---|---|
| L1 | 101 | G1 | Data L1 × G1 |
| L2 | 102 |  | Data L2 × G1 |
| L3 | 103 |  | Data L3 × G1 |
| ... | ... |  | ... |
| L32 | 132(W1) |  | Data L32 × G1 |
| L33 | 133 | G2 | Data L33 × G2 |
| L34 | 134 |  | Data L34 × G2 |
| ... | ... |  | ... |
| L64 | 164(W2) |  | Data L64 × G2 |
| L65 | ... | G3 | Data L65 × G3 |
| ... | ... |  | ... |
| L96 | W3 |  | Data L96 × G3 |
| L97 |  | G4 | Data L97 × G4 |
| ... | ... |  | ... |
| L128 | W4 |  | Data L128 × G4 |

When the scanning module 201 performs a scanning operation at the position of the first scan line L1, the reference white plate 204 is also scanned. Since the luminance of the lamp tube has not reached the stable state when the scanning operation is performed at the position of the first scan line L1, the luminance value of the reference white plate 204 at that moment is slightly increased to for example 101. Under this circumstance, the luminance value of the image data obtained at the position of the first scan line L1 is lower than the normal value. As the luminance of the lamp tube is increased with time, the luminance value of the reference white plate 204 is gradually increased during the scanning period.

Figure 4:
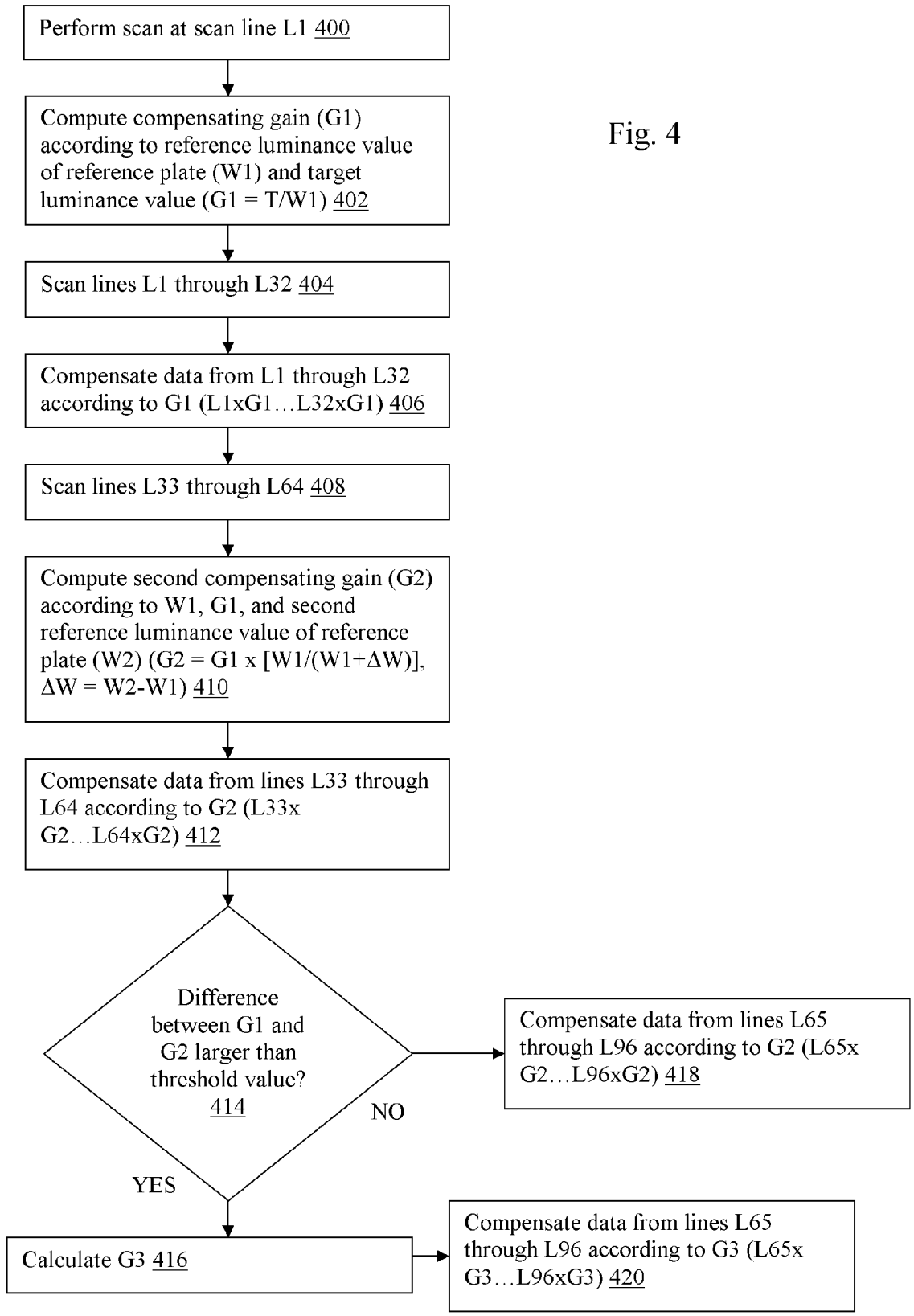
FIG. 4 is a process flow diagram of a method for compensating luminance values in accordance with an embodiment of the present invention.

Referring to FIG. 4, furthermore, a target luminance value T, which is the luminance value of the reference white plate 204 obtained in the stable state, is stored in the personal computer. In this embodiment, the target luminance value T is 200.

In a case that the position of the scan line L32 serves as a first scanning position, the luminance value of the reference white plate 204 obtained when the scanning operation is performed at this first scanning position L32 at block 400, for example 132, is referred as a first reference luminance value W1. Under this circumstance, a compensating gain G1 is computed according to the target luminance value T(=200) and the first reference luminance value W1(=132) at block 402.

In this example, G1=T/W1=200/132=1.5151.

Since the first reference luminance value WI of the reference white plate is obtained when the lamp tube has not reached the stable state, the luminance value thereof should be compensated with the compensating gain G1 so as to achieve the target luminance value T.

After the luminance values Data L1.about.Data L32 of the original image data for the scan lines L1.about.L32 obtained at block 404 are multiplied by the gain G1 at block 406, respectively, the compensated luminance values Data L1.times.G1.about.Data L32.times.G1 of the image data are obtained. The compensated luminance values are substantially equal to those obtained when the luminance of the lamp tube is in the stable state.

Subsequently, in a case that the position of the scan line L64 serves as a second scanning position, the luminance value of the reference white plate 204 obtained when the scanning operation is performed at this second scanning position L64 at block 408, for example 164, is referred as a second reference luminance value W2. Under this circumstance, a second compensating gain G2 is computed at block 410 according to the first reference luminance value W1(=132), the first compensating gain G1(=1.5151) and the second reference luminance value W2(=164), in which: G2=G1.times.[W1/(W1+.DELTA.W)],.DELTA.W=W2−W1

According to the above euation,G2=200/132×[1332/132+(164−132))]=1.2195

At block 414 it is determined if the difference between the first compensating gain G1 and the second compensating gain G2 is larger than a threshold value such as 0.1, the luminance value of the original digital image data are compensated with the second compensating gain G2, and then the third compensating gain G3 is computed at block 416. In this example, the difference between the first compensating gain G1(=1.5151) and the second compensating gain G2(=1.2195) is 0.2956, which is larger than the threshold value. Under this circumstance, after the luminance values Data L33.about.Data L64 of the original image data for the scan lines L33-L64 are multiplied by the gain G2(=1.2195) at block 418, respectively, the compensated luminance values Data L33.times.G2.about.Data L64.times.G2 of the image data are obtained.

By the way, since the luminance value change between two neighboring scan lines is small, the computation for obtaining the compensating gain is performed when a certain number of successive scan lines are scanned. The luminance values of these scan lines are compensated with the same compensating gain. In this embodiment, for every 32 successive scan lines, a computation for obtaining the compensating gain will be done.

In accordance to the similar method, the third compensating gain G3 is then computed. Assuming the third compensating gain G3 is 1.1234, which is less than the second compensating gain G2(=1.2195), the luminance values of the original image data for the scan lines L65.about.L96 are compensated with the third compensating gain G3 at block 420.

In accordance to the similar method, the fourth compensating gain G4 is then computed. Assuming the fourth compensating gain G4 is 1.1111, the luminance values of the original image data for the scan lines L97~L128 are compensated with the fourth compensating gain G4. Alternatively, the luminance values need not be compensated because the fourth compensating gain G4 is nearly equal to the third compensating gain G3(=1.1234).

If the fourth compensating gain G4 is nearly equal to the third compensating gain G3, it is meant that the luminance value change of image data between this group of scan lines and the previous group of scan lines is very tiny. Under this circumstance, the lamp tube has reached the stable state, and thus the next gain computation can be exempted.

In the above embodiments, the luminance values are compensated in a case that the difference between two neighboring compensating gains is larger than a threshold value such as 0.1. However, this threshold value may be varied and preset according to the luminance value requirement depending on the manufacturer's design.

From the above description, the compensation method of digital image data according to the present invention can be simplified as follows:

(1) storing a target luminance value T of the reference white plate 204 in the personal computer 100;

(2) allowing the personal computer 100 to compute the first compensating gain GI according to the target luminance value T and the first reference luminance value W1 obtained from the reference white plate 204 of the image scanner 200, wherein G1=T/W1;

(3) multiplying the luminance values of the original image data for the scan lines L1~L32 with the first compensating gain G1, respectively, so as to obtain the compensated luminance values of the image data for the scan lines L1~L32;

(4) allowing the personal computer 100 to compute the second compensating gain G2 according to the second reference luminance value W2 obtained from the reference white plate 204 of the image scanner 200, wherein $$G2 = G1 \times [W1/(W1+\Delta W)], \Delta W = W2 - W1$$

(5) compensating the original luminance values of image data for the current group of scan lines (i.e. L33~L64) with the current compensating gain and computing another compensating gain G3 if the current compensating gain is larger than the previous compensating gain by a threshold value, until the current compensating gain is nearly equal to the previous compensating gain, compensating the original luminance values of image data with the current compensating gain without performing next compensating gain computation.

From the above description, since the luminance values of image data are compensated by directly computing the image signals of image data, no additional circuitry is required for performing the no warm-up scanning operation. In addition, since the compensating gain computation are performed by using software to compare the luminance values of the reference white plate obtained at different scanning positions, the cost for implementing this compensation method is largely reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A compensation method for compensating digital image data generated by a scanning module of a scanner when a luminance of a lamp is unstable, said compensation method comprising:

measuring a first reference luminance value W1 obtained by scanning a reference color region illuminated by the lamp at a first scanning position by means of the scanning module;

computing a first compensating gain G1 according to a target luminance value T and said first reference luminance value W1, wherein G1=T/W1;

measuring a second reference luminance value W2 obtained by scanning said reference color region at a second scanning position by means of the scanning module;

computing a second compensating gain G2 according to said first reference luminance value W1, said first compensating gain G1 and said second reference luminance value W2;

compensating original luminance values of the image data with said second compensating gain G2 and computing a third compensating gain G3 if said first compensating gain G1 is larger than said second compensating gain G2 and a difference between the first compensating gain G1 and the second compensating gain G2 is larger than a threshold value; and compensating the original luminance values of the image data with said second compensating gain G2 without computing said third compensating gain G3 if said second compensating gain G2 is less than said first compensating gain G1 and the difference between said first compensating gain G1 and said second compensating gain G2 is less than said threshold value.

2. The compensation method for compensating digital image data according to claim 1 wherein said reference color region has a white color, and said target luminance value T is obtained when said scanning module scans said reference color region in a stable state of said lamp tube.

3. The compensation method for compensating digital image data according to claim 1 wherein said first scanning position is distant from said second scanning position by a plurality of scan lines.

4. The compensation method for compensating digital image data according to claim 1 further comprising a step of compensating said image data from said first scanning position to said second scanning position with said first compensating gain G1 after the step of computing said first compensating gain G1.

5. The compensation method for compensating digital image data according to claim 1 wherein $G2=G1\times[W1/(W1+\Delta W)]$, $\Delta W=W2-W1$.

6. The compensation method for compensating digital image data according to claim 1 wherein the step of compensating said image data is implemented by multiplying the luminance values of said image data by said second compensating gain G2.

7. An image scanning system comprising:
  an image scanner for generating a digital image signal of a scanned object, and comprising a lamp tube for providing a source light to be used for scanning said scanned object, a scanning module, a color reference region and an output port for outputting said digital image signal;
  a data processing device electrically connected to said output port of said image scanner for receiving and compensating said digital image signal generated when a luminance of said lamp tube of said image scanner is unstable, wherein said data processing device is programmed to compensate said digital image signal according to the luminance values of said color reference region by a method including:
  providing a first reference luminance value W1 obtained when said scanning module scans a reference color region at a first scanning position;
  computing a first compensating gain G1 according to a target luminance value T and said first reference luminance value W1;
  providing a second reference luminance value W2 obtained when said scanning module scans said reference color region at a second scanning position;
  computing a second compensating gain G2 according to said first reference luminance value W1, said first compensating gain G1 and said second reference luminance value W2;
  compensating original luminance values of image data with said second compensating gain G2 and computing a third compensating gain G3 if said first compensating gain G1 is larger than said second compensating gain G2 and a difference between the first compensating gain G1 and the second compensating gain G2 is greater than a threshold value; and
  compensating the original luminance values of image data with said second compensating gain G2 without computing said third compensating gain G3 if said second compensating gain G2 is less than said first compensating gain G1 and the difference between said first compensating gain G1 and said second compensating gain G2 is less than said threshold value.

8. The image scanning system according to claim 7 wherein said data processing device is a personal computer, and said compensating step is implemented by software installed in said personal computer.

9. The image scanning system according to claim 7 wherein said reference color region has a white color, and said target luminance value T is obtained when said scanning module scans said reference color region in a stable state of said lamp tube.

10. A luminance compensation method for compensating digital image data of plural scan lines generated from a scanning module of a scanner, said luminance compensation method comprising steps of:
  computing a first compensating gain according to a first luminance value of a reference color region at a first scanning position illuminated by a lamp and measured by means of the scanning module, and compensating luminance values of digital image data for N scan lines with said first compensating gain;
  computing a second compensating gain according to a second luminance value of said reference color region at a second scanning position illuminated by the lamp and measured by means of the scanning module, and compensating the luminance values of digital image data for M scan lines with said second compensating gain; and
  comparing said first compensating gain with said second compensating gain, and computing a third compensating gain if a difference between the first compensating gain and the second compensating gain is larger than a threshold value and not calculating said third compensating gain if said second compensating gain is less than said first compensating gain and the difference therebetween is less than said threshold value.

11. The luminance compensation method of claim 10 wherein the reference color is white.

12. The luminance compensation method of claim 10 wherein said first scanning position is distant from said second scanning position by a plurality of scan lines.

13. The luminance compensation method of claim 10 wherein the first and second luminance values correspond to measurements of light produced by a cold cathode fluorescent light.

14. The luminance compensation method of claim 13 wherein the cold cathode fluorescent light is disposed within a desktop scanner.

15. The luminance compensation method of claim 10 wherein the first and second luminance values correspond to outputs of an image sensor.

16. The luminance compensation method of claim 15 wherein the image sensor is a charge coupled device.

17. The luminance compensation method of claim 10 wherein the method is performed by a personal computer.

* * * * *

UNITED STATES PATENT AND TRADEMARK OFFICE
CERTIFICATE OF CORRECTION

PATENT NO. : 7,733,519 B2  Page 1 of 1
APPLICATION NO. : 11/124974
DATED : June 8, 2010
INVENTOR(S) : Feng et al.

It is certified that error appears in the above-identified patent and that said Letters Patent is hereby corrected as shown below:

Column 6
Line 67, after "lamp" delete "tube"

Column 7
Line 31, before "luminance values" delete "the"

Signed and Sealed this

Twelfth Day of October, 2010

David J. Kappos
*Director of the United States Patent and Trademark Office*